United States Patent
Davies

(10) Patent No.: US 7,543,509 B2
(45) Date of Patent: Jun. 9, 2009

(54) DEVICE FOR MEASURING THE MASS RATE OF FLOW HAVING A BOBBIN FOR A MAGNETIC COIL MADE FROM A MATERIAL HAVING A SPECIFIC THERMAL CONDUCTIVITY

(75) Inventor: Lawrence Davies, Corby (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/463,750

(22) Filed: Aug. 10, 2006

(65) Prior Publication Data

US 2007/0062309 A1 Mar. 22, 2007

(30) Foreign Application Priority Data

Aug. 19, 2005 (DE) .................. 10 2005 039 577

(51) Int. Cl.
*G01F 1/84* (2006.01)
(52) U.S. Cl. .................... 73/861.357; 336/61
(58) Field of Classification Search ................
73/861.355–861.357
See application file for complete search history.

(56) References Cited

U.S. PATENT DOCUMENTS

| 4,876,898 | A |   | 10/1989 | Cage et al. | |
|---|---|---|---|---|---|
| 5,681,989 | A | * | 10/1997 | Kanke et al. | 73/118.2 |
| 6,223,605 | B1 | * | 5/2001 | Koudal et al. | 73/861.357 |
| 6,469,606 | B1 | * | 10/2002 | Tada et al. | 336/83 |
| 6,600,402 | B1 | * | 7/2003 | LaFleur et al. | 336/61 |
| 6,839,643 | B2 | * | 1/2005 | Kanke et al. | 702/45 |
| 7,424,376 | B2 | * | 9/2008 | Carpenter | 702/50 |
| 2005/0109121 | A1 | * | 5/2005 | Kanke et al. | 73/861.47 |
| 2006/0217901 | A1 | * | 9/2006 | Kanke et al. | 702/45 |

FOREIGN PATENT DOCUMENTS

| JP | 8-338749 | | 12/1996 |
|---|---|---|---|
| JP | 10-227677 | | 8/1998 |
| JP | 2007052016 A | * | 3/2007 |

* cited by examiner

*Primary Examiner*—Harshad Patel
(74) *Attorney, Agent, or Firm*—David S. Safran; Roberts Mlotkowski Safran & Cole, P.C.

(57) ABSTRACT

A device for measuring the mass rate of flow which operates according to the Coriolis principle, with a measurement tube (1) and a magnet coil (7) of a bobbin (9) and a winding (10) attached to it for exciting and/or detecting vibrations of the measurement tube (1). The bobbin (9) of the magnet coil (7) has a specific thermal conductivity of at least 1 W/(K m). This enables the heat which forms in the magnet coil (7) to be efficiently dissipated to the surrounding vicinity without cooling elements, such as cooling fins, being necessary. In this way, the efficiency of the device for measuring the mass rate of flow using the Coriolis principle is altogether improved.

4 Claims, 2 Drawing Sheets

DEVICE FOR MEASURING THE MASS RATE OF FLOW HAVING A BOBBIN FOR A MAGNETIC COIL MADE FROM A MATERIAL HAVING A SPECIFIC THERMAL CONDUCTIVITY

BACKGROUND OF THE INVENTION

1. Field of the Invention

The invention relates to a device for measuring the mass rate of flow which works according to the Coriolis principle, with a measurement tube and a vibration generator and/or a vibration sensor for exciting and detecting vibrations of the measurement tube, the vibration generator and the vibration sensor having a magnet coil with a bobbin and a winding attached to it.

2. Description of Related Art

Devices for measuring the mass rate of flow using the Coriolis principle are well known from the prior art. In this connection, there are devices with only a single measurement tube or with several, often two parallel measurement tubes, and the measurement tube or measurement tubes can be made straight or looped. Devices for measuring the mass rate of flow using the Coriolis principle require that the measurement tube be sent into vibration and that the vibrations which result when flow takes place through the measurement tube be detected.

Magnet coils are often designed to excite vibrations of the measurement tube or to detect vibrations of the measurement tube. If such a magnet coil is exposed to a current, it generates a magnetic field; this field results in a force being exerted on the magnet located within the magnet coil. Based on this principle, the measurement tube of a device for measuring the mass rate of flow using the Coriolis principle can be excited to vibrations.

However, by applying a current to the magnet coil, therefore based on the fact that a current flows through the winding of the magnet coil provided on the bobbin, heating of the magnet coil occurs. It is necessary to limit this temperature rise especially for applications of a device for measuring the mass rate of flow using the Coriolis principle in explosion-prone areas.

The prior art generally discloses limiting the temperature rise of the magnet coil by dissipating the resulting heat onto a larger surface than the surface given by the magnetic field itself. Especially for high power applications, it is thus provided that the heat be dissipated from the magnet coil by its being routed to a generally metallic heat sink by means of a jacket or an enclosure with high thermal conductivity. Thus, the heat flow away from the magnet coil into the vicinity of the magnet coil is facilitated, by which the surface temperature of the magnet coil is reduced. However, this procedure is disadvantageous with respect to its relatively high costs and reduced efficiency as a result of formation of eddy currents in the metallic heat sink.

SUMMARY OF THE INVENTION

Accordingly, a primary object of the present invention is to devise a device for measuring the mass rate of flow which operates according to the Coriolis principle and which is efficiently suitable for high power applications without leading to overly high temperatures of the magnet coil which is designed for vibration excitation and/or for detection of vibrations of the measurement tube.

Proceeding from the initially described device for measuring the mass rate of flow, this object is achieved in that the bobbin of the magnet coil has a specific thermal conductivity of at least 1 W/(K m).

Therefore the invention takes a completely new approach by the magnet coil itself specifically the bobbin, being made such that the resulting heat can be easily dissipated to the vicinity without farther contrivances. In contrast to conventional technology, this is much more economical, and furthermore based on possible omission of the heat sink such as a metallic cooling sheet, generation of eddy currents can be avoided so that the efficiency of the magnet coil is improved.

It has been shown that good heat dissipation from the magnet coil can be achieved when it has a specific thermal conductivity of at least 1 W/(K m). However, according to one preferred development of the invention, it is provided that the bobbin of the magnet coil has a specific thermal conductivity of at least 1.5 W/(K m), preferably of at least 5 W/(K m), and quite especially preferably of at least 10 W/(K m).

Fundamentally, a variety of materials can be used for the bobbin of the magnet coil. However, according to one preferred development of the invention, it is provided that the bobbin of the magnet coil has a thermally conductive elastomer, and preferably the thermally conductive elastomer is thermally conductive polyphenylene sulfide.

One especially suitable material which is offered by the company Cool Polymers, Inc., is the plastic and carbon polymer CoolPoly® D5108. Thermally Conductive Polyphenylene Sulfide (PPS) has a specific thermal conductivity of 10 W/(K m). However, this material not only has a good specific thermal conductivity in order to dissipate the heat which forms in the magnet coil to the vicinity, but is temperature-resistant above 250° C., and in the useful temperature range has mechanical properties which easily meet the requirements in a device for measuring the mass rate of flow using the Coriolis principle for the bobbin of a magnet coil for excitation and/or detection of vibrations of the measurement tube.

According to one alternative development of the invention, it is provided that the bobbin of the magnet coil has a thermally conductive ceramic. A variety of thermally conductive ceramics can also be used here, and the respective thermal conductivity can be matched to the respective application of the device for measuring the mass rate of flow using the Coriolis principle and the associated requirement to dissipate the heat which is formed in the magnet coil.

Finally, according to one preferred development of the invention, it is also provided that the magnet coil is potted with a potting material to further improve heat dissipation. The potting materials are preferably casting resins which, in addition to good heat dissipation, also ensure reliable electrical insulation.

In particular, there are numerous possibilities for embodying and developing the device for measuring the mass rate of flow in accordance with the invention. In this respect, reference is made to the following detailed description of a preferred exemplary embodiment with reference to the accompanying drawings.

DETAILED DESCRIPTION OF THE INVENTION

Figure 1:
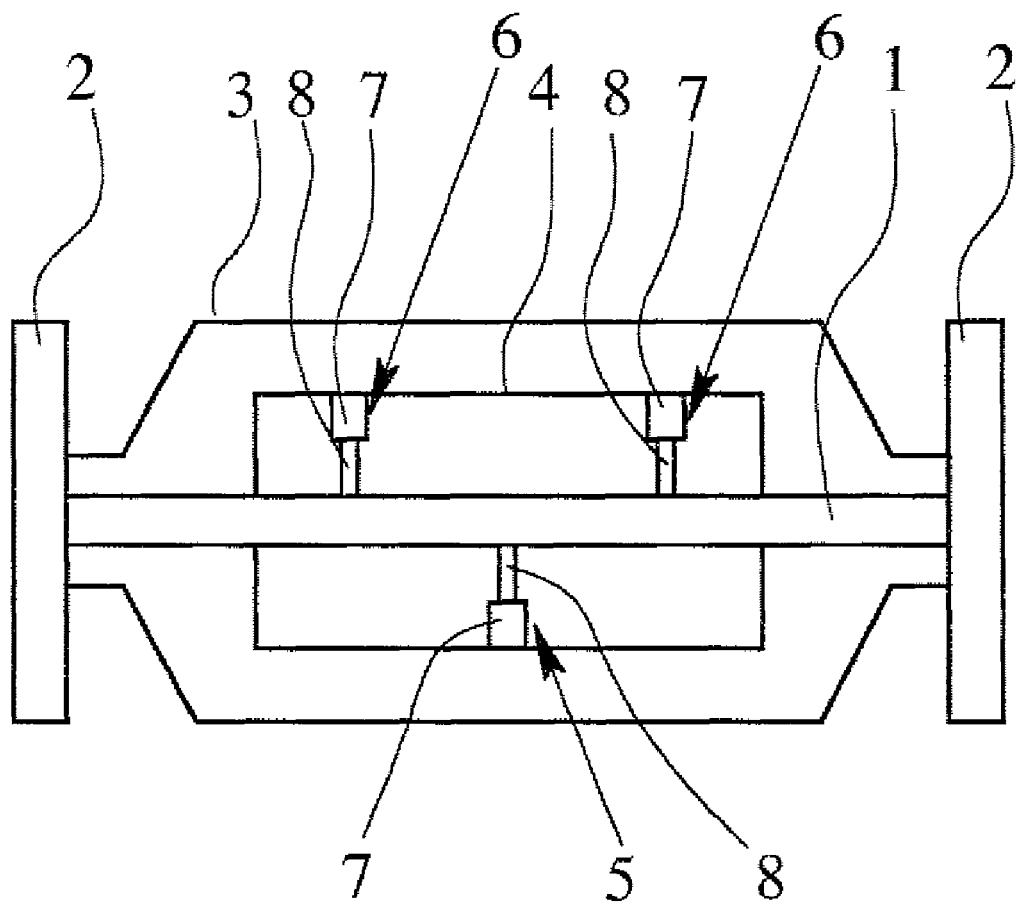
FIG. 1 is schematic sectional view of a device for measuring the mass rate of flow using the Coriolis principle according to a preferred exemplary embodiment of the invention with a vibration exciter and two vibration sensors and FIG. 2 is a cross-sectional view of a magnet coil for a vibration exciter or a vibration sensor of the device for measuring the mass rate of flow using the Coriolis principle according to the preferred exemplary embodiment of the invention.

FIG. 1 schematically shows a device for measuring the mass rate of flow using the Coriolis principle according to a preferred exemplary embodiment of the invention with a single straight measurement tube 1. The measurement tube 1 has a flange 2 on each of its two ends, with which the measurement tube 1 can be installed in a pipeline system, which is not further shown. The measurement tube 1 is located within a housing 3 in which there is an inner cylinder 4. Between the inner cylinder 4 and the measurement tube 1, there are a vibration generator 5 and two vibration sensors 6.

The vibration generator 5 and the two vibrations sensors 6 each have a magnet coil 7 and a magnet 8 located in the magnet coil 7. As initially described, the respective magnet coil 7, when it is exposed to current, generates a magnetic field; this results in a force being exerted on the magnet 8 which is located within the magnet coil 7. The vibration generator 5 is operated in this way to excite the measurement tube 1 of the device to vibrations for measuring the mass rate of flow using the Coriolis principle.

Figure 2:
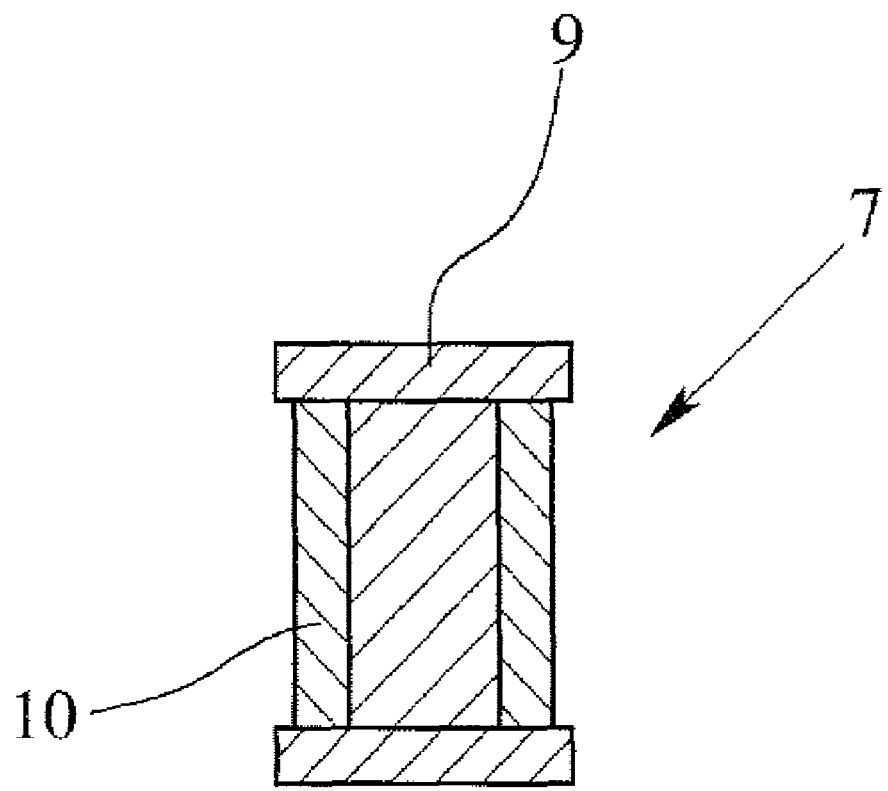

FIG. 2 shows, in detail, a magnet coil 7 as is used for the vibration generator 5 and the vibration sensor 6. Here, the magnet coil 7 comprises a bobbin 9 and a winding 10 attached thereto. At this point it is important for the bobbin 9 of the magnet coil 7 to be produced from a material which has a high, specific thermal conductivity. In this case, the material for the magnet coil 9 is a thermally conductive elastomer with a specific thermal conductivity of 10 W/(K m), specifically conductive polyphenylene sulfide. Use of such a material results in the heat which forms in the magnet coil 7 being efficiently dissipated to the surrounding environment without additional cooling sheets or the like having to be provided.

What is claimed is:

1. Coriolis measuring device for measuring the mass rate of flow, comprising:
   a measurement tube; and
   at least one of a vibration generator and a vibration sensor for at least one of exciting and detecting vibrations of the measurement tube, the at least one of the vibration generator and the vibration sensor having a magnet coil with a bobbin and a winding attached thereto,
   and
   wherein the bobbin of the magnet coil is free of cooling appendages and has a specific thermal conductivity of at least 10 W/(K m) in a manner enabling heat which forms in the magnet coil to be sufficiently dissipated to the surrounding environment without cooling appendages.

2. Coriolis measuring device for measuring the mass rate of flow as claimed in claim 1, wherein the bobbin of the magnet coil is made of a thermally conductive clastomer.

3. Device for measuring the mass rate of flow as claimed in claim 2, wherein the thermally conductive elastomer is thermally conductive polyphenylene sulfide.

4. Device for measuring the mass rate of flow as claimed in claim 1, wherein the bobbin is made of a thermally conductive ceramic.

* * * * *